(12) United States Patent
Panda et al.

(10) Patent No.: US 9,436,566 B2
(45) Date of Patent: Sep. 6, 2016

(54) METHODS, SYSTEMS, AND COMPUTER READABLE MEDIA FOR SCALING A WORKLOAD

(71) Applicant: Ixia, Calabasas, CA (US)

(72) Inventors: Sumit Panda, Kolkata (IN); Sujit Kundu, Kolkata (IN); Pratyush Kumar Khan, Kolkata (IN); Narottam Pattanayak, Kolkata (IN)

(73) Assignee: IXIA, Calabasas, CA (US)

( * ) Notice: Subject to any disclaimer, the term of this patent is extended or adjusted under 35 U.S.C. 154(b) by 97 days.

(21) Appl. No.: 14/445,921

(22) Filed: Jul. 29, 2014

(65) Prior Publication Data

US 2016/0034372 A1    Feb. 4, 2016

(51) Int. Cl.
| G06F 11/00 | (2006.01) |
| G06F 11/263 | (2006.01) |
| G06F 11/22 | (2006.01) |
| G06F 11/34 | (2006.01) |

(52) U.S. Cl.
CPC ......... G06F 11/263 (2013.01); G06F 11/2205 (2013.01); G06F 11/3414 (2013.01)

(58) Field of Classification Search
None
See application file for complete search history.

(56) References Cited

U.S. PATENT DOCUMENTS

| 6,542,854 | B2* | 4/2003 | Yang | G06F 11/3409 |
| | | | | 702/108 |
| 6,769,054 | B1* | 7/2004 | Sahin | G06F 11/3466 |
| | | | | 711/162 |
| 6,792,393 | B1* | 9/2004 | Farel | G06F 11/079 |
| | | | | 702/176 |
| 7,328,134 | B1* | 2/2008 | Burbidge, III | G06F 11/3414 |
| | | | | 702/186 |
| 8,984,341 | B1* | 3/2015 | Chandrasekharapuram | G06F 11/00 |
| | | | | 714/32 |
| 2002/0087282 | A1* | 7/2002 | Millard | G06F 11/3414 |
| | | | | 702/108 |
| 2002/0184614 | A1* | 12/2002 | Davia | G06F 11/3696 |
| | | | | 717/127 |
| 2003/0154432 | A1* | 8/2003 | Scott | G01R 31/3185 |
| | | | | 714/724 |
| 2004/0015600 | A1* | 1/2004 | Tiwary | G06F 11/3414 |
| | | | | 709/234 |
| 2005/0216234 | A1* | 9/2005 | Glas | G06F 11/3414 |
| | | | | 702/186 |
| 2007/0069005 | A1* | 3/2007 | Dickerson | G06Q 20/40 |
| | | | | 235/379 |
| 2007/0112549 | A1* | 5/2007 | Lau | G06F 11/3414 |
| | | | | 703/13 |
| 2009/0259704 | A1 | 10/2009 | Aharoni et al. | |
| 2010/0111494 | A1* | 5/2010 | Mazzaferri | H04L 29/06 |
| | | | | 386/343 |
| 2012/0311387 | A1* | 12/2012 | Santhosh | G06F 11/3433 |
| | | | | 714/33 |
| 2013/0055026 | A1* | 2/2013 | Hatano | G06F 11/263 |
| | | | | 714/32 |
| 2013/0282354 | A1* | 10/2013 | Sayers | G06F 11/3433 |
| | | | | 703/21 |
| 2014/0006358 | A1* | 1/2014 | Wang | G06F 17/30289 |
| | | | | 707/687 |
| 2014/0013306 | A1* | 1/2014 | Gounares | G06F 11/362 |
| | | | | 717/124 |

(Continued)

OTHER PUBLICATIONS

Sommers and Barford, "Self-Configuring Network Traffic Generation", Oct. 25-27, 2004, IMC'04.*

(Continued)

*Primary Examiner* — Gabriel Chu
(74) *Attorney, Agent, or Firm* — Jenkins, Wilson, Taylor & Hunt, P.A.

(57) ABSTRACT

Methods, systems, and computer readable media for scaling a workload are disclosed. According to one exemplary method, the method occurs at a network equipment test device. The method includes generating a first workload comprising a plurality of messages associated with one or more transactions. The method also includes determining one or more workload segments in the first workload, wherein each of the one or more workload segments represents one or more messages associated with a particular transaction and generating a second workload using the one or more workload segments, wherein the second workload includes a number of the workload segments based on a workload scale attribute.

20 Claims, 6 Drawing Sheets

(56) References Cited

U.S. PATENT DOCUMENTS

| | | | |
|---|---|---|---|
| 2014/0047272 A1* | 2/2014 | Breternitz | G06F 11/3495 714/32 |
| 2014/0067940 A1 | 3/2014 | Li et al. | |
| 2014/0068335 A1* | 3/2014 | Bromley | H04L 43/50 714/32 |
| 2014/0378057 A1 | 12/2014 | Ramon et al. | |
| 2015/0120797 A1 | 4/2015 | Roy et al. | |
| 2015/0293826 A1 | 10/2015 | Sincan et al. | |

OTHER PUBLICATIONS

"Fisher-Yates Shuffle," http://en.wikipedia.org/wiki/Fisher-Yates_shuffle, pp. 1-11, May 8, 2014 (retrieved on May 27, 2014).

Commonly-assigned, co-pending U.S. Appl. No. 14/251,547 for "Method and System for Hardware Implementation of Uniform Random Shuffling," (Unpublished, filed Apr. 11, 2014).

Commonly-assigned, co-pending U.S. Appl. No. 14/158,659 for Methods, Systems, and Computer Readable Media for Selecting Numbers from Multiple Ranges (Unpublished, filed Jan. 17, 2014).

"ImpairNetTM—EIM1G4S, EIM10G4S, and EIM40G2Q Ethernet Impairment Load Module," pp. 1-5, Jul. 2013 (retrieved on May 27, 2014).

Corrected Notice of Allowability for U.S. Appl. No. 14/158,659 (Jan. 11, 2016).

Notice of Allowance and Fee(s) Due for U.S. Appl. No. 14/158,659 (Dec. 11, 2015).

* cited by examiner

FIG. 4

Command Properties for 'WorkLoad'

- WorkLoad
- Target LUN Id
- Execution Time (sec): 0
- Delay Time (ms): 0
- Logical Block Address (Start Position)
- Offset: 0
- Data Transfer Length
  - ☐ Entire LUN
  - Total Transfer Length: 363963392 Bytes
- Workload Selection
- Workload Type: VMware-ESXi-VM-BOOT-STORM Emulates iSCSI IO pattern of typical Virtual Machine booting using VMware ESXi.

400

METHODS, SYSTEMS, AND COMPUTER READABLE MEDIA FOR SCALING A WORKLOAD

TECHNICAL FIELD

The subject matter described herein relates to testing devices. More specifically, the subject matter relates to methods, systems, and computer readable media for scaling a workload.

BACKGROUND

When testing various devices, it is important to make sure that testing mimics real world scenarios and conditions. For example, when testing storage devices, it may be necessary to mimic a typical workload (e.g., an amount of work that is processed or handled by a device under test (SUT)). Conventional testing devices may provide predefined workloads for testing purposes. However, such workloads are limited and generally do not cover all scenarios that customers (e.g., storage device manufacturers or service providers) may want to test. Further, while some conventional testing devices may allow a customer to modify a predefined workload, modifying a predefined workload is typically cumbersome and time intensive.

Accordingly, in light of these difficulties, a need exists for improved methods, systems, and computer readable media for scaling a workload.

SUMMARY

Methods, systems, and computer readable media for scaling a workload are disclosed. According to one exemplary method, the method occurs at a network equipment test device. The method includes generating a first workload comprising a plurality of messages associated with one or more transactions. The method also includes determining one or more workload segments in the first workload, wherein each of the one or more workload segments represents one or more messages associated with a particular transaction and generating a second workload using the one or more workload segments, wherein the second workload includes a number of the workload segments based on a workload scale attribute.

According to one exemplary system, the system includes a network equipment test device. The network equipment test device includes at least one processor and memory. The system also includes a workload module utilizing the at least one processor and the memory. The workload module is configured to generate a first workload comprising a plurality of messages associated with one or more transactions, to determine one or more workload segments in the first workload, wherein each of the one or more workload segments represents one or more messages associated with a particular transaction, and to generate a second workload using the one or more workload segments, wherein the second workload includes a number of the workload segments based on a workload scale attribute.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 4 is a diagram illustrating an exemplary user interface for configuring a workload according to an embodiment of the subject matter described herein;

DETAILED DESCRIPTION

Figure 1:
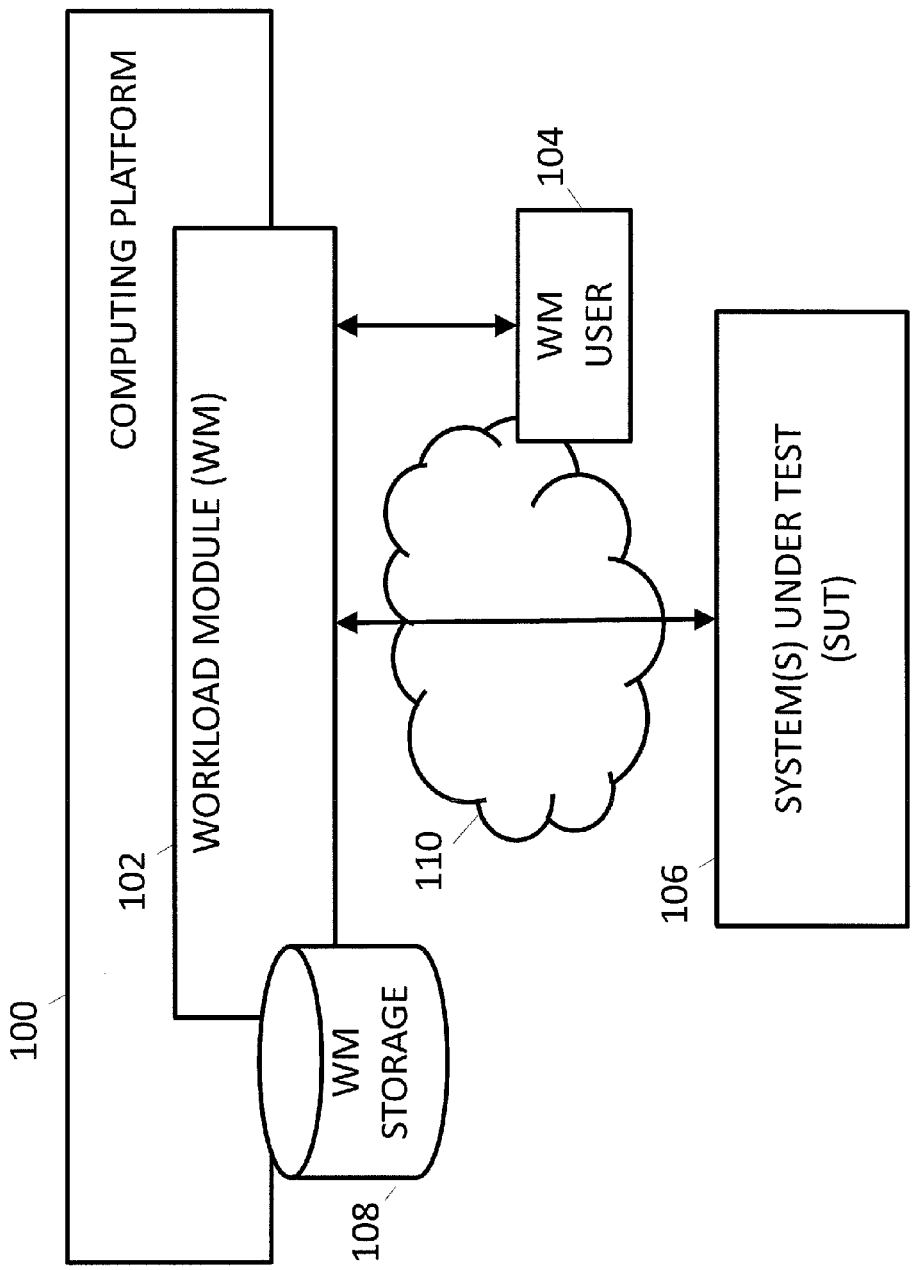
FIG. 1 is a diagram illustrating an exemplary computing platform for scaling a workload according to an embodiment of the subject matter described herein.

The subject matter described herein discloses methods, systems, and computer readable media for scaling a workload. Workload creation is an important aspect associated with testing devices and/or related networks. However, conventional techniques for generating workloads are generally tedious, error-prone, and very time consuming for users. For example, a test operator may spend days manually generating a workload that emulates a real workload pattern for testing performance of a server or other system under test (SUT). Further, while manually generating a workload is possible, issues are exacerbated when attempting to test multiple devices or different aspects of a SUT. For example, a test operator may need to manually generate additional workloads or substantially modify existing workloads for different tests and/or testing environments. Accordingly, it may be desirable to efficiently model and scale a workload such that one workload may be used for a variety of testing environments and/or conditions.

In accordance with some aspects of the subject matter described herein, a workload may be generated using a message capture process. For example, a testing platform may include a traffic generator configured to use message capture data (e.g., a packet capture (PCAP) file from Wireshark® or another message capture application) or a related data (e.g., an extensible markup language (XML) file or a character-separated values (CSV) file) to generate or recreate a workload by extracting information about a protocol command sequence and related attributes from the message capture data. By using a message capture process, a real world workload may be analyzed and processed to generate an exact copy of the captured workload or a similar workload. Moreover, using this capture data and/or additional data, a user can generate various workloads easily and quickly without manually creating protocol command sequences with appropriate attributes.

In accordance with some aspects of the subject matter described herein, a workload may be scaled or modified for various environments and/or testing purposes. For example, a testing platform may be configured to use message capture data taken from an environment containing a first server and to generate a same or similar workload for testing a second server having a different configuration, e.g., a different storage size and/or identifiers. In another example, a testing platform may be configured to use message capture data to generate a realistic workload (e.g., an internet small computer system interface (iSCSI) workload) that can be used over and over again and can be used for testing various SUTs in various environments, e.g., with or without modifying the original content and pattern. As such, scaling and/or modifying a workload can efficiently test (e.g., debug and/or develop) various SUTs using realistic use cases.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an exemplary computing platform 100 for scaling a workload according to an embodiment of the subject matter described herein. Computing platform 100 may represent any suitable entity or entities (e.g., a testing platform or a server farm) for modeling, generating, scaling, and/or emulating a workload. For example, computing platform 100 may generate a workload associated with a Windows Server file system, where a 1000 concurrent emulated users request an assorted mix of media files.

In some embodiments, computing platform 100 may be configured to perform one or more aspects associated with testing SUT 106. In some embodiments, computing platform 100 may be a stand-alone tool, a testing device, or software executing on a processor. In some embodiments, computing platform 100 may be a single node or may be distributed across multiple computing platforms or nodes.

Computing platform 100 may include a workload module (WM) 102. WM 102 may be any suitable entity (e.g., software executing on a processor) for performing one or more aspects associated with workload modeling, workload generation, workload scaling, and/or workload emulation. WM 102 may include functionality for generating or scaling a workload using data. For example, WM 102 may receive captured data from a message capture application. In this example, WM 102 may generate an XML file based on the message capture data. The XML file may be usable for defining a workload containing one or more messages and/or attributes therein associated with the captured data.

In some embodiments, WM 102 may include a traffic generator that may use message capture data or related information for sending traffic (e.g., messages) associated with a workload. For example, WM 102 may generate a workload file usable by a traffic generator (e.g., a software module executing on a processor) to send realistic messages to SUT 106. In this example, the workload file may also be usable by the traffic generator or WM 102 for determining or configuring protocol state machines and/or other mechanisms such that responses from SUT 106 are handled appropriately.

In some embodiments, WM 102 and/or another entity may provide for selection and/or customization of a workload or workload related data via a user interface. For example, WM user 104 (e.g., a device or computing platform usable by a user or a test operator) may configure message attributes (e.g., a logical unit (LU) identifier (ID), an extent offset, etc.) and/or other information via the user interface. In addition to providing functionality for selection and/or configuration of workload related data, WM 102 may include functionality for storing the workload related data for future use.

In some embodiments, after capturing traffic data, a percentage mapping may be performed for converting or scaling a workload. For example, a percentage mapping may be performed such that a similar workload to the captured traffic data can be performed regardless of the amount of data a target has available for testing. In this example, a percentage mapping may be usable to scale a workload involving a data transfer of 100 MB such that the scaled workload can be used for logical unit number (LUN) sizes of 1 GB, 100 GB, or even 10 MB.

In some embodiments, WM 102 or related entity may scale and emulate a workload that is within an acceptable deviation of 5-10% of an original workload captured by a message capture application.

In some embodiments, WM 102 may include functionality for instantiating or initializing workload(s) and/or for providing the workload(s) to other computing platforms or devices. For example, WM 102 may use workloads or related data to emulate a workload or may provide workload related data to other nodes that emulate the workload.

In some embodiments, WM 102 may include or access WM storage 108 containing information related to workload modeling, workload generation, workload scaling, and/or workload emulation. For example, WM 102 may access WM storage 108 containing workload related files, settings, or configurations. Exemplary data storage in WM storage 108 may include non-transitory computer readable media, such as flash memory, random access memory, or other storage devices. In some embodiments, WM storage 108 may be external to and/or or integrated with computer platform 100 and/or WM 102.

In some embodiments, WM 102 may include one or more communications interfaces for interacting with users and/or nodes. For example, WM 102 may provide a communications interface for communicating with WM user 104. In some embodiments, WM user 104 may be an automated system or may be controlled or controllable by a human user. WM user 104 may select and/or configure information for modeling, generating, scaling, and/or emulation of a workload.

In some embodiments, WM 102 may include one or more communications interfaces for interacting with one or more systems under test (SUT) 106. SUT 106 may be any suitable entity or entities (e.g., storage devices or filers) implementing, accessing, or otherwise using a workload or workload related messages. For example, SUT 106 may be an enterprise data storage system including multiple physical storage devices or components. SUT 106 may communicate with one or more emulated users associated with a workload or workload related data. For example, WM 102 may be configured to emulate five hundred users that request multiple files from SUT 106. In this example, SUT 106 may respond by processing file requests and providing the files when appropriate and providing error messages or discarding the requests when inappropriate.

In some embodiments, WM 102 may include functionality to generate a workload for testing SUT 106. For example, WM 102 may be configured to generate messages (e.g., iSCSI, CSCI, or other input and/or output (I/O) messages) associated with a workload and may send or provide the messages to SUT 106. In response, SUT 106 may provide responses and/or requested content to emulated users, e.g., during a testing period. For example, WM 102 or another module may emulate a workload for requesting content at or controlled by SUT 106 (e.g., emulated users may request some content, save additional content, and/or deleted some content).

In some embodiments, WM 102 may be configured to model, generate, scale, and/or emulate a workload based on existing content, e.g., at SUT 106. For example, during workload generation, WM user 104 may import an existing workload related file and may scale the workload to test a particular SUT 106 different from the device in the workload related file. In this example, the scaled workload may be configured such that emulated users request, access, or modify existing content at SUT 106.

It will be appreciated that FIG. 1 is for illustrative purposes and that various nodes and/or modules, locations, and/or functionality described above in relation to FIG. 1 may be changed, altered, added, or removed.

Figure 2:
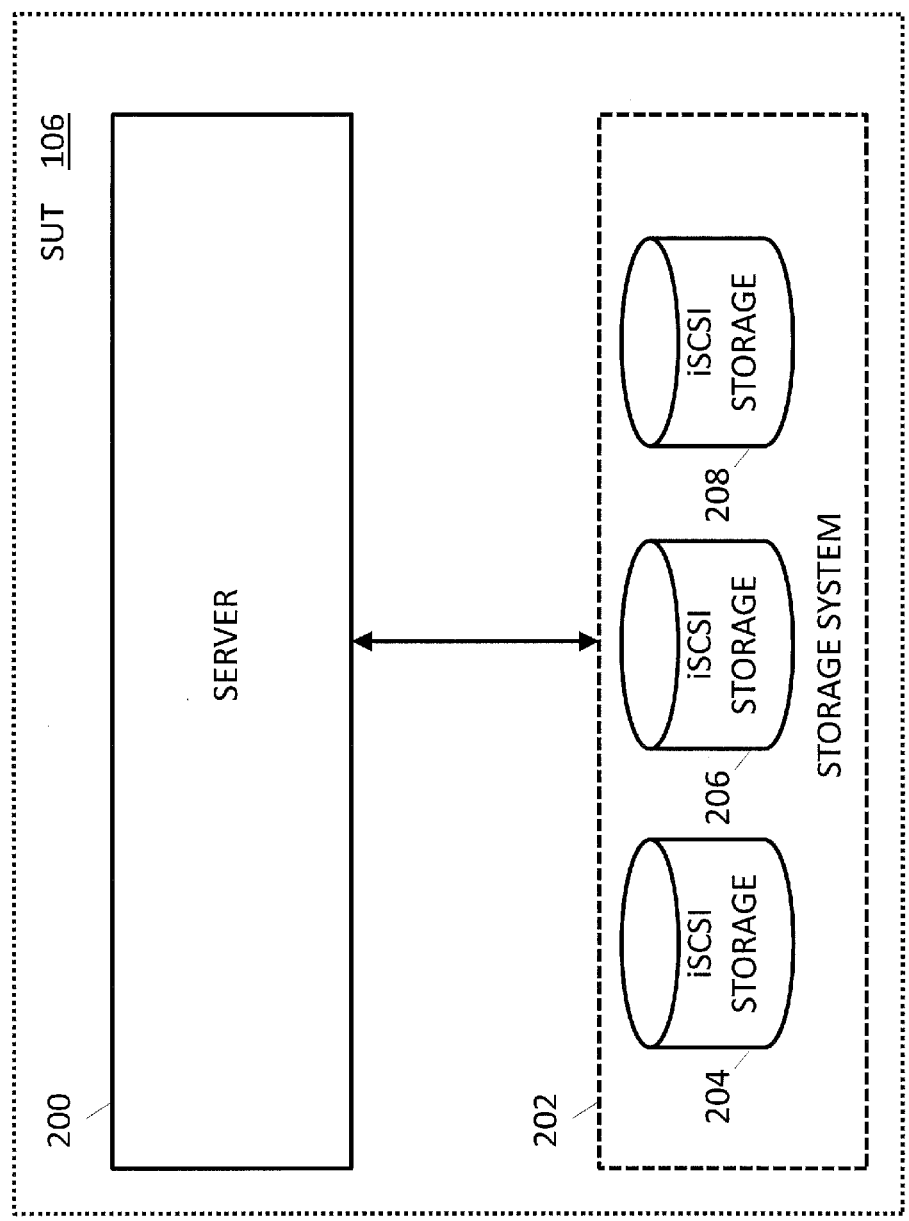
FIG. 2 is a diagram illustrating an exemplary system under test (SUT) according to an embodiment of the subject matter described herein.

FIG. 2 is a diagram illustrating an exemplary system under test (SUT) according to an embodiment of the subject matter described herein. In some embodiments, SUT 106 may include nodes, devices, and/or networks associated with an iSCSI protocol or a similar protocol. For example, SUT 106 may represent a storage area network and/or one or more servers for storing and/or retrieving data from one or more storage devices.

Referring to FIG. 2, SUT 106 may include a server 200 and a storage system 202 including storage devices 204-208. Server 200 may represent any suitable entity for controlling storage system 202. For example, server 200 may represent a Windows server or a Linux server. In this example, server 200 may receive iSCSI messages for requesting data from a client (e.g., WM 102 and/or another entity) and may communicate the iSCSI messages or related information to storage system 202. Continuing with this example, server 200 may send or forward responses, including data, from storage system 202 to the client. In another example, storage system 202 or storage devices 204-208 may respond to clients directly.

Storage system 202 may represent any suitable entity or entities for maintaining data. In some embodiments, storage system 202 may be implemented on a computing platform or distributed across multiple computing platforms or devices. For example, storage system 202 may represent a storage area network including storage devices 204-208. Each of storage devices 204-208 may represent any suitable entities for storing or maintaining data. For example, storage devices 204-208 may include non-transitory computer readable media, such as flash memory, random access memory, or other storage devices.

In some embodiments, storage devices 204-208 may communicate with server 200 and/or other entities using iSCSI commands and/or related protocols. In such embodiments, storage devices 204-208 may be referred to as iSCSI targets.

In some embodiments, server 200 may present or provide each of storage devices 204-208 as a drive, e.g., for clients to access. In some embodiments, server 200 may utilize a network file system (NFS) share, a server message block (SMB) share, or a common Internet file system (CIFS) share. For example, each iSCSI target may appear as a disk partition (e.g., an "E:" or "F:" drive) at server 200. In this example, any actions that are directed to the drives may be converted into iSCSI commands and sent to the iSCSI targets.

In some embodiments, e.g., where computing platform 100 communicates with server 200, server 200 may act as a SMB, a NFS, and/or a CIFS server. In such embodiments, server 200 may provide access to storage system 202 as one or more remote SCSI drives.

In some embodiments, SUT 106 may include functionality for monitoring and/or capturing traffic that traverses SUT 106 or entities therein. For example, server 200 and/or one or more of storage devices 104-108 may execute a message capture application. In this example, the message capture application(s) may capture or record iSCSI messages or other messages.

In some embodiments, a message capture application or related functionality may capture iSCSI messages or commands therein being sent to or received from SUT 106 or entities therein. In some embodiments, a message capture application or related functionality may be located at a switch or other routing device between SUT 106, its components, and/or computing platform 100.

In some embodiments, a message capture application or related functionality may record, identify, and/or log various characteristics about traffic sent to or received from SUT 106. For example, some exemplary characteristics logged may include block size of iSCSI read commands, block size of iSCSI write commands, whether a set of commands are sequential (e.g., requesting files that are stored in a contiguous storage area) or random (e.g., requesting files that are stored in non-contiguous storage areas), percentages or ratios associated with random commands and sequential commands, a total amount of data (e.g., using logical block addressing (LBA)) accessed for a given transaction or time period, and other commands (e.g., metadata commands or login commands).

In some embodiments, a message capture application or related functionality may include a tool to convert captured packet data into an intermediate file, e.g., an XML file.

In some embodiments, WM 102, computing platform 100, and/or another entity associated with computing platform 100 may communicate with server 200 and/or other entities associated with SUT 106. For example, computing platform 100 or related entities may act as clients when requesting or receiving data from server 200.

In some embodiments, server 200 may include functionality for running or executing virtual machines (VMs). For example, server 200 may execute VMWare ESX software or other virtualization software and may emulate multiple Windows or Linux VMs.

In some embodiments, a message capture application may capture an I/O transaction (e.g., an iSCSI request and a related response) as a transfer control protocol (TCP) stream. In some embodiments, a message capture application may capture multiple I/O transactions as multiple, interleaved TCP streams.

In some embodiments, computing platform 100 and/or related entities may emulate a network attached storage (NAS) client for communicating with SUT 106 and/or entities therein. For example, an emulated NAS client may send messages for reading and writing data to SUT 106.

In some embodiments, actions performed by a NAS client may include small file writes (e.g., where file size is between 1 kilobyte (KB) and 1024 KBs), large file writes (e.g., where file size is between 1 megabyte (MB) and 10 MBs), small file reads (e.g., where 50% are sequential reads and 50% are random reads on small files), large file reads (e.g., where 50% are sequential reads and 50% are random reads on large files), write then reads (e.g., small file writes, large file writes, small file reads, and large file reads), access and privilege related commands (e.g., access lookups and/or access control list (ACL) changes), benchmark testing (e.g., performing a standardized test (e.g., SPECsFS) on SUT 106), error related actions (e.g., performing access violations, access rejections, attempting to delete non-accessible files).

It will be appreciated that FIG. 2 is for illustrative purposes and that various nodes and/or modules, locations, and/or functionality described above in relation to FIG. 2 may be changed, altered, added, or removed.

Figure 3:
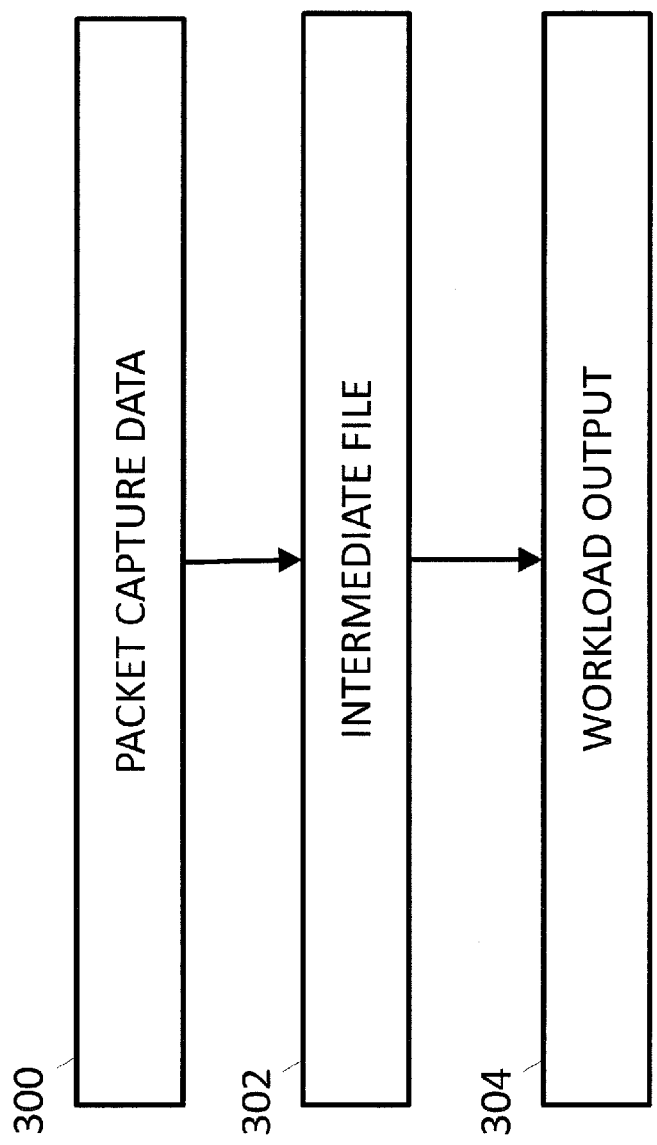
FIG. 3 is a diagram illustrating an exemplary process for generating a workload according to an embodiment of the subject matter described herein.

FIG. 3 is a diagram illustrating an exemplary process for generating a workload according to an embodiment of the subject matter described herein. In some embodiments, workload related data may be stored in one or more formats and/or files. For example, WM 102 may convert and/or utilize a message capture file (e.g., a packet capture (PCAP) file), an XML file, a compressed file (e.g., a ZIP or TAR file), a binary file, and/or an executable file. In some embodiments, workload In the embodiment illustrated in FIG. 3, generating a workload may include steps 300, 302, and/or 304. At step 300, message capture data may be gathered and/or received. For example, a message capture application may be executing at SUT 106 or computing platform 100. In this example, the message capture application may store information about messages that traverse SUT 106 or computing platform 100 in a PCAP file.

At step 302, an intermediate file may be generated based on the message capture data of step 300. For example, WM 102 or another entity (e.g., a traffic generator) may import a message capture file and convert this file into a lightweight intermediate file, such as an XML or CSV file. In this example, WM user 104 may select a particular TCP flow or iSCSI transaction and create a workload flow using this selection. Continuing with example, the flow may be pre-processed (e.g., filtered to remove certain messages or message attributes) and saved as an XML or CSV file, e.g., by WM 102 and/or another entity, such as a capture converter module.

In some embodiments, a flow and/or packets therein may be preprocessed such that supported packet data units (PDUs) and supported PDU fields or attributes (e.g., header information) are saved in an intermediate file. For example, a capture converter module may be configured to filter message capture data (e.g., messages, packets, commands, and/or attributes or fields) that are not needed or not reproducible in a metadata file, such as an XML file. In this example, WM user 104 may be able to (re)configure the capture converter module to handle or convert (e.g., not filter) various types of message capture data.

In some embodiments, WM 102 and/or another entity (e.g., a traffic flow builder) may filter message capture data and/or related information into one or more sessions and/or applications. For example, WM 102 and/or another entity may use a four tuple (e.g., source address, source port, destination address, and destination port) to sort captured traffic into one or more sessions associated with an iSCSI application or protocol. In this example, WM 102 and/or another entity may generate a workload file and/or intermediate file for each session or application or may generate a file containing multiple sessions and/or applications.

TABLE 1

| I/O ACCESSED (READ/WRITE) | ACCESSED OFFSET (START → END) | LOGICAL BLOCKS TRANSFERRED |
|---|---|---|
| Read | 18 → 20 | 3 |
| Write | 10 → 13 | 4 |
| Read | 14 → 17 | 4 |
| Write | 21 → 21 | 1 |
| | TOTAL | 12 |

In some embodiments, an intermediate file may include configuration related information associated with message capture data. For example, WM 102 and/or another entity may store information about a packet pattern, a starting offset (e.g., a value indicating a location of a storage portion or logical block) associated with one or more packets, a data transfer length (e.g., in logical blocks) associated with one or more packets, and/or a total amount of data (e.g., logical blocks) transferred in a capture period.

In some embodiments, metadata commands may also be captured by a message data capture process and may be recorded or stored in an intermediate file.

In some embodiments, WM 102 and/or another entity may determine and/or record information about individual messages associated with a message capture period. For example, referring to Table 1, an intermediate file or related data structure may maintain offset ranges (e.g., a start offset and an end offset) for each captured message, may indicate a number of logical blocks transferred associated with each message, and/or a total number of blocks transferred for all messages. As depicted in Table 1, a first row indicates a read message having an associated start offset of '18' and an end offset of '20' for a total of '3' logical blocks transferred for the message, a second row indicates a write message having an associated start offset of '10' and an end offset of '13' for a total of '4' logical blocks transferred for the message, a third row indicates a read message having an associated start offset of '14' and an end offset of '17' for a total of '4' logical blocks transferred for the message, and a fourth row indicates a write message having an associated start offset of '21' and an end offset of '21' for a total of '1' logical blocks transferred for the message. Continuing with this example, as depicted in Table 1, a total of '12' logical blocks may be transferred.

At step 304, workload output may be generated. For example, an intermediate file may be downloaded to a traffic generator (e.g., at computing platform 100). In this example, the traffic generator may use the intermediate file and/or other data to generate workload output, e.g., traffic that emulates a real world pattern.

In some embodiments, WM 102 and/or another entity may generate one or more additional files (e.g., a workload file or a binary file) based on the intermediate file (e.g., prior to generating workload output). For example, a workload file may include a command or message sequence and related attributes that are to be emulated. In this example, a protocol state machine associated with a traffic generator may use or execute a workload file with little to manual intervention from WM user 104.

In some embodiments, after generating an intermediate file and/or a workload file but prior to sending the file(s) to a traffic generator, WM 102 and/or another entity may allow a user (e.g., WM user 104) to adjust or modify one or more parameters and/or other attributes associated with messages represented in the file(s) or related workload.

In some embodiments, after receiving workload related data, a traffic generator or other entity may allow a user (e.g., WM user 104) to adjust or modify one or more parameters and/or other attributes associated with messages represented in the file(s) or related workload. For example, during an apply configuration phase, a generated XML file may be obtained by a traffic generator. In this example, the traffic generator may parse the XML file and populate a command or message data structure, where the traffic generator may be configured to use the data structure for sending messages to SUT 106 and/or for appropriately handling response messages from SUT 106.

the formula would be ((18-10)+0)+12*1) which yields 20. In yet another example, assuming a second iteration (e.g., a $1^{st}$ iteration) and a first write message depicted in row 2 of Tables 1 and 2 being sent where the user start offset is '5', the formula would be ((10-10)+5)+12*1) which yields 17.

In some embodiments, an iteration value 'I' may start at 0 and may increment sequentially, e.g., for each iteration of a workload or workload segment. In such embodiments, workloads may access data or related logical blocks sequentially or in a predictive manner, which may or may not be preferable.

In some embodiments, a pseudo-random selection process may be used to generate an iteration value 'I'. For example, a selection technique described below with regard to FIG. 5 may select an integer for 'I' between 0 and ((M/X)/B), where each integer for this iteration value is selected only once. By using such a selection technique, a data pattern (e.g., read,

TABLE 2

| IO ACCESSED (READ/WRITE) | NORMALIZING OFFSET VALUE | MODIFIED START OFFSET | BLOCKS TRANSFERRED | BYTES TRANSFERRED |
|---|---|---|---|---|
| READ | 10 | (8 + Y) + (B * I) | 3 | 3 * X BYTES |
| WRITE | 10 | (0 + Y) + (B * I) | 4 | 4 * X BYTES |
| READ | 10 | (4 + Y) + (B * I) | 4 | 4 * X BYTES |
| WRITE | 10 | (11 + Y) + (B * I) | 1 | 1 * X BYTES |
|  |  | TOTAL | 12 | 12 * X BYTES |

In some embodiments, an intermediate file (e.g., a metadata entity) and/or workload related data may be processed using varying input based on user input and environment related information. For example, referring to Table 2, a LU block size may be represent by 'X', a start offset may be represented by 'Y', a final end offset may be represented by 'Z', an iteration value may be represented by 'I', a total number of logical blocks transferred in a workload or workload segment (e.g., all message in Table 2) may be represented by 'X', and a total transfer length may be represented by 'M'. In this example, a total number of logical blocks to transfer may be computed as M/X.

In some embodiments, WM 102 and/or another entity may compute and/or use some changing attributes or message characteristics (e.g., data depicted in Table 2) for each workload segment or workload to be executed (e.g., played or sent to SUT 106). For example, WM 102 and/or another entity may compute a start offset for each message, where the start offset may continue to change for each iteration of a workload or workload segment executed, e.g., until (M/X) blocks have been transferred or until a new start offset for a message lies beyond Z (e.g., a final end offset).

In some embodiments, a modified offset (e.g., an offset from normalizing offset value) for a given message in workload may be determined using a formula: ((original offset value−normalizing offset value)+user-defined start offset)+(B*I). For example, assuming a first iteration (e.g., a $0^{th}$ iteration) and a first read message depicted in row 1 of Tables 1 and 2 being sent where the user start offset is '0', the formula would be ((18-10)+0)+12*0) which yields 8. In another example, assuming a first iteration (e.g., a $1^{st}$ iteration) and a first read message depicted in row 1 of Tables 1 and 2 being sent where the user start offset is '0', write, read, write, etc.) may be repeated but without requiring data or logical blocks to be accessed sequentially or in a predictable manner.

In some embodiments, workload output may include other messages other than read and write commands, e.g., messages not shown in Tables 1 and 2. For example, iSCSI metadata messages may be stored in an intermediate file and may be executed in an exact sequence executed in the traffic captured in step 300.

It will be appreciated that FIG. 3 is for illustrative purposes and that additional and/or different steps from those described above in relation to FIG. 3 may be changed, altered, added, or removed.

FIG. 4 is a diagram illustrating an exemplary user interface for configuring a workload according to an embodiment of the subject matter described herein. In some embodiments, WM 102 and/or associated module or node may include a graphical user interface (GUI) for generating a workload, scaling a workload, and/or configuring workload related information. In some embodiments, configuring a workload may include configuring testing parameters, target (e.g., test) environment information, protocol settings, messages, and/or message attributes associated with the workload.

Referring to FIG. 4, exemplary screenshot 400 illustrates some settings or configurations associated with configuring a workload. Screenshot 400 may depict user interface elements for selecting settings and/or options associated with a workload.

In some embodiments, a drop down menu box may allow a user to select a workload type or profile (e.g., a VMware-ESXi-VM-BOOT-STORM) from a plurality of predetermined (e.g., previously stored user-defined or factory-set)

workloads. For example, a workload type may be selected for emulating an iSCSI I/O pattern associated with typical VM booting using VMWare ESXI software.

In some embodiments, exemplary traffic profiles for various iSCSI environments may include a VM boot storm, a VM copy upload (e.g., client-server I/O commands), a VM abrupt shutdown, a VM power off, and/or a VM normal deploy.

In some embodiments, text input box(es) may allow a user to input information about a test or target environment and/or testing parameters. For example, a LUN ID, an execution time, and a delay time may be inputted. In another example, a LBA offset value may be inputted. In this example, the LBA offset value may indicate a start position (e.g., a boundary) for all read or write commands such that no commands (e.g., in a particular test) read or write to an LBA less than the LBA offset value.

In some embodiments, a text input box, an option box, and/or a drop down menu box may allow a user to input information about a data length transfer, e.g., amount of data accessed for a particular test. For example, an entire LUN option may be selected indicated that a workload should test data stored across an entire LUN. In this example, if an entire LUN option is selected and the LUN is associated with a 10 GB storage portion, a workload may be generated and/or scaled that comprises commands for writing and/or reading 10 GBs of data associated with the selected LUN. In another example, a particular byte, MB, or GB value may be inputted. In this example, a workload may be generated and/or scaled that comprises commands for writing and/or reading the particular data amount associated with the selected LUN.

Figure 5:
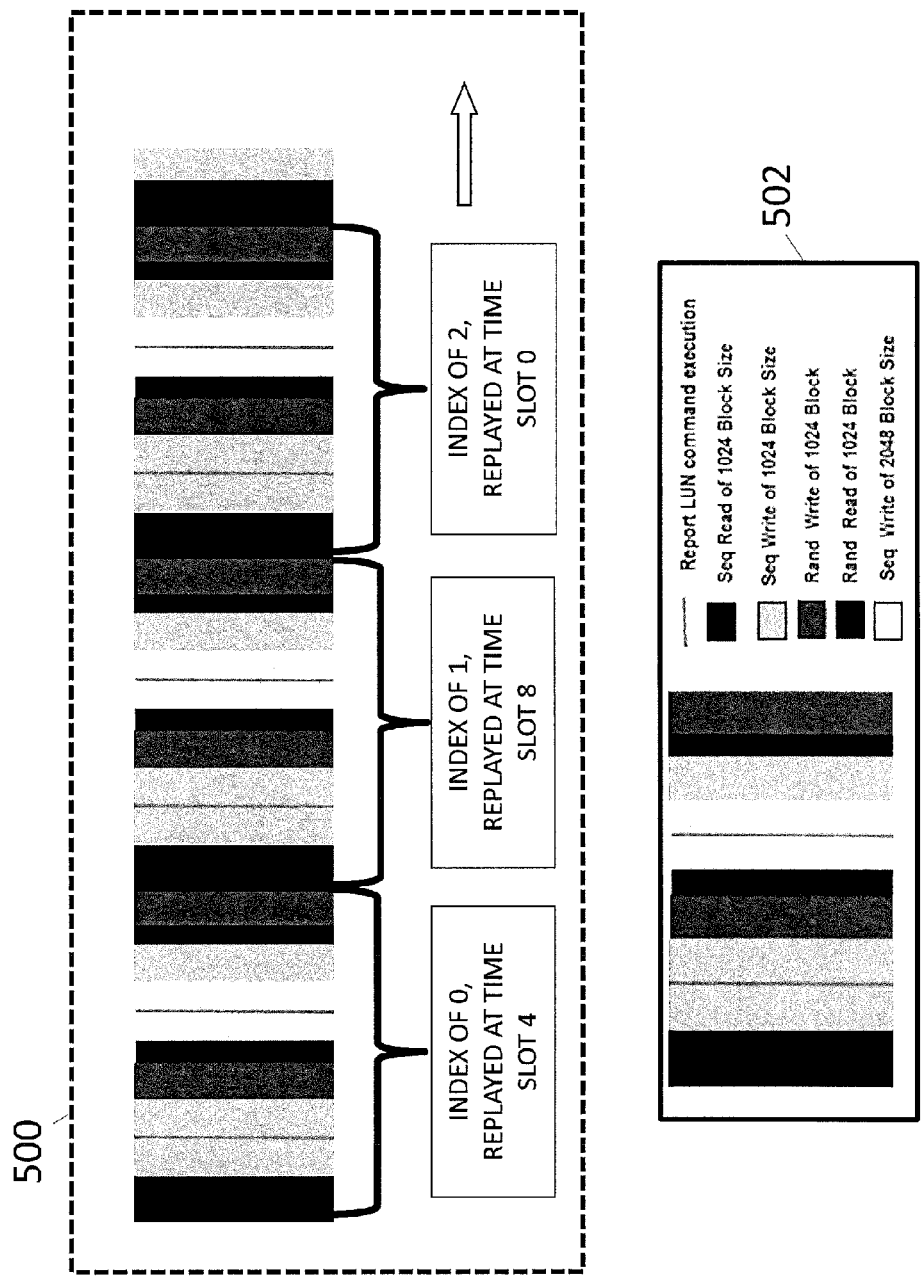
FIG. 5 is a diagram illustrating an exemplary sequence of workload segments according to an embodiment of the subject matter described herein.

It will be appreciated that FIG. 4 is for illustrative purposes and that various user interface elements described above in relation to FIG. 4 may be changed, altered, added, or removed. It will also be appreciated that user input may be submitted using various other techniques. For example, workload related data and associated configuration information may be provided via an API and/or command line interface FIG. 5 is a diagram illustrating an exemplary sequence 500 of workload segments 502 according to an embodiment of the subject matter described herein. In some embodiments, configuration information may be used and/or inputted for modifying or transforming predetermined workloads and/or workload related data (e.g., captured iSCSI traffic patterns) such that a workload is generated and/or scaled for a particular testing environment (e.g., an iSCSI target having particular characteristics).

In some embodiments, a scaling algorithm may be usable for modifying or transforming workloads and/or workload related data. For example, a scaling algorithm may include one or more techniques for ensuring a unique and/or non-repeatable sequence 500 of workload segments 502. In this example, a workload may be analyzed and/or represented as one or more workload segments 502 (e.g., logical portions of a workload).

In some embodiments, a workload segment 502 may represent an original or non-scaled workload. For example, workload segment 502 may represent logical portions of a workload or traffic pattern and may include messages captured by a message capture application. In this example, workload segment 502 may include multiple read commands, write commands, and/or other traffic (e.g., metadata commands) associated with real or live communications between an iSCSI target and an iSCSI client.

In some embodiments, a scaling algorithm may use workload segments 502, configuration information, and/or a pseudo-random selection process to generate a scaled workload (e.g., a workload that is larger or smaller than an original or base workload). For example, each workload segment 502 in a scaled workload may be unique based on configuration information and/or a selection process which ensure a pseudo-random distribution of one or more message characteristics (e.g., start offset values).

In some embodiments, exemplary data that may be usable by a scaling algorithm includes an LU block size, an LU ID, a start offset, a total transfer length, and/or message capture data. For example, exemplary message capture data that may be usable by a scaling algorithm includes a packet or message pattern (e.g., a read and write I/O pattern), a starting offset from the packets or messages, and/or a transfer length in logical blocks or bytes from the packets or messages.

In some embodiments, scaling a workload may include determining one or more workload segments 502 from available workloads or workload related data. For example, WM user 104 may indicate that an original workload having a data transfer length of 10 MB is to be scaled to a workload having a data transfer length of 1 gigabyte (GB). In this example, WM 102 may use a scaling algorithm for determining that an appropriate workload segment 502 for generating the scaled workload is the original workload. Using this determination, WM 102 may determine that workload segment 502 and messages therein should be copied and modified one hundred times (e.g., 1 GB=1000 MB; 1000 MB/10 MB=100).

In some embodiments, scaling a workload may include down-scaling an original or non-scaled workload. For example, WM user 104 may indicate that an original workload having a data transfer length of 1 GB is to be scaled to a workload having a data transfer length of 10 MB. In this example, WM 102 may use a scaling algorithm to generate a down-scaled version of the original workload where the data requested by read or write commands in the scaled workload are adjusted to request $\frac{1}{100}$ of the data requested in the original commands.

In some embodiments, each workload segment 502 in sequence 500 may include a same data pattern. For example, each workload segment 502 may include a same number of read commands, a same number of write commands, and/or a same number of metadata commands (e.g., a report LUN command, an inquiry LUN command, and/or a test unit ready command).

In some embodiments (e.g., where each workload segment 502 in sequence 500 includes a same data pattern), each workload segment 502 may have a unique start offset and/or other unique characteristics. For example, where one hundred workload segments 502 are to be generated for sequence 500, the start offset of each workload segment 502 may be incremented. In this example, assuming each workload segment 502 include a data transfer length of 10 MB, a first workload segment 502 may start at a 0 bit position, a second workload segment 502 may start at a 10,000 bit position, a third workload segment 502 may start at a 20,000 bit position, and so on and so forth until the last workload segment 502.

In some embodiments, a group of workload segments 502 for a scaled workload may be maintained using a data structure, such as an array or list. For example, an array may include one hundred workload segments 502, where each of the workload segments 502 is indexed by a unique value between 0 and 99. In this example, if each workload segment 502 is executed as ordered in the array (e.g., using a counter and counting in ascending order from 0 to 99), a scaled workload may be generated and executed, however the traffic patterns of the scaled workload may be more predictive and/or access distribution may be less balanced than preferable.

While using a counter which increments sequentially through a range of values may allow unique numbers to be selected, a counter may not provide an arbitrary (e.g., a random or pseudo-random) selection sequence. For example, if a scaling algorithm or WM 102 just returned values indicated by a counter which increments sequentially through a range of values, the returned numbers or selection sequence would indicate workload segments 502 in sequential order in the data structure. To provide an arbitrary selection sequence, one exemplary selection technique may include processing values indicated by a counter using a function, where the function produces output values in an arbitrary manner.

In some embodiments, a pseudo-random selection process may use a bit mapping mechanism, also referred to as a bit mapper, for arbitrary number selection, e.g., number selection that is random or appears to be random. A bit mapper may be a sequence of numbers usable for rearranging bits associated with a particular number. By rearranging bits, a bit mapper may generate seemingly arbitrary output from sequential or ordered input. For example, a number (e.g., a decimal representation of a number or a base 10 integer numeral) may be represented using one or more bits, e.g., using a binary or base 2 numeral system. In other words, a number in binary form may include one or more binary digits (e.g., bits; each digit may represent an increasing power of 2, with the rightmost digit representing $2^0$, the next digit representing $2^1$, and so on. Therefore, converting a binary number to a decimal representation may involve adding the products of the binary digits and the powers of 2 which they represent. In particular, if a binary number is '1001', the binary number may be converted to a decimal representation of '9' as follow: $1001=[(1)\times2^3]+[(0)\times2^2]+[(0)\times2^1]+[(1)\times2^0]=9$.

While rearranging bits associated with input numbers may be usable for producing a sequence of non-repetitive numbers from another sequence of non-repetitive numbers, there may be no guarantee that using a bit mapper and input numbers from a set of numbers between X and Y will generate or output numbers between X and Y. One way to guarantee that output numbers include numbers between X and Y may include using a number of bits N such that the number of bits N represents at least every number between X and Y. For example, using number of bits N, numbers between (and including) 0 and $2^N-1$ may be represented. In this example, using a fixed bit mapper and input numbers between (and including) 0 and $2^N-1$, output numbers may be generated between (and including) 0 and $2^N-1$.

Additional information regarding exemplary selection techniques usable for generating and/or scaling workloads is disclosed in U.S. patent application Ser. No. 14/158,659 entitled "METHODS, SYSTEMS, AND COMPUTER READABLE MEDIA FOR SELECTING NUMBERS FROM MULTIPLE RANGES", filed Jan. 17, 2014; the disclosure of which is incorporated herein by reference in its entirety.

In some embodiments, a scaling algorithm may use a pseudo-random selection process for selecting a sequence 500 of workload segments 502 (e.g., to be executed) associated with a scaled workload. For example, assuming an array of one hundred workload segments 502, WM 102 may use a pseudo-random selection process to select a workload segment 502 from the array to be executed for a given workload or sequence 500. In this example, the pseudo-random selection process may be configured to generate an integer between 0 and 99, where the integer represents the index value of the workload segment 502 to be executed.

In some embodiments, a pseudo-random selection process or algorithm may be configured to select a particular workload segment 502 exactly once for a workload and/or to ensure random collection and/or execution of workload segments 502. For example, referring to sequence 500 depicted in FIG. 5, a workload segment 502 associated with an index value of '0' may be executed or replayed (e.g., by a traffic generator) at time slot '4', a second workload segment 502 associated with an index value of '2' may be executed or replayed at time slot '8', and a third workload segment 502 associated with an index value of '2' may be executed or replayed at time slot '0'. In this example, sequence 500 may be executed or used for a first test, while different sequences 500 may be executed or used for subsequent tests.

It will be appreciated that FIG. 5 is for illustrative purposes and that additional and/or different scaling or selection techniques than those described above in relation to FIG. 5 may be used for generating and/or scaling a workload.

Figure 6:
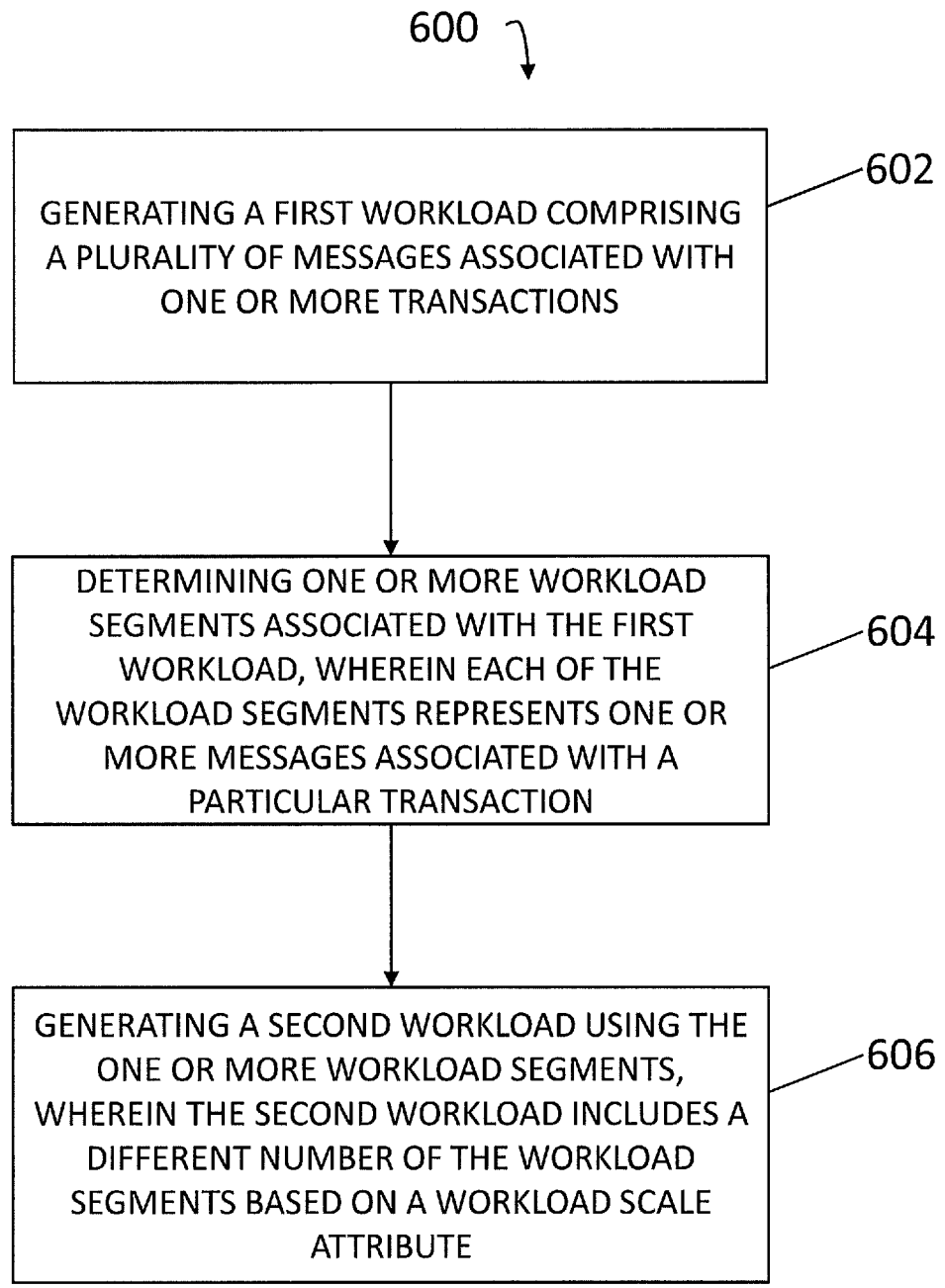
FIG. 6 is a diagram illustrating an exemplary process for scaling a workload according to an embodiment of the subject matter described herein.

FIG. 6 is a diagram illustrating an exemplary process for scaling a workload according to an embodiment of the subject matter described herein. In some embodiments, exemplary process 600, or portions thereof, may be performed by or at computing platform 100 (e.g., a network equipment test device), WM 102, and/or another node or module.

At step 602, a first workload may be generated. The first workload may comprise a plurality of messages associated with one or more transactions. For example, a first workload may include iSCSI commands for requesting files from SUT 106 or writing files to SUT 106.

At step 604, one or more workload segments 502 in the first workload may be determined. In some embodiments, each of the one or more workload segments 502 may represent one or more messages associated with a particular transaction. For example, a first workload segment 502 may represent messages associated with requesting and receiving a first file from SUT 106 and a second workload segment 502 may represent messages associated with requesting and receiving a second file from SUT 106.

At step 606, a second workload may be generating using the one or more workload segments 502. In some embodiments, a second workload may include a number of the workload segments 502 based on a workload scale attribute. For example, WM 102 may be configured to scale a first workload to transfer 10× more data than a first workload. In this example, WM 102 may scale the first workload by generating 10× more of each different workload segment 502 in the first workload and reordering at least some of the generated workload segments 502 (e.g., in relation to the order of workload segments 502 in the first workload) for the second workload.

In some embodiments, after generating and/or scaling a workload, messages associated with the workload may be sent to SUT 106.

In some embodiments, a workload scale attribute may include a workload data transfer length, a workload data rate, or a workload duration.

In some embodiments, a first workload may be generated based on messages detected using a message capture process. For example, WM user 104 may use Wireshark® or another program to capture "real" or live traffic sent to or received from SUT 106. Using the message capture data, WM 102 and/or another entity may generate an intermediate data file or a workload file for executing or replaying simulated traffic that is similar in content and/or structure (e.g., message sequence) to the original captured traffic.

In some embodiments, messages detected using a message capture process are filtered and stored in an extensible markup language (XML) file usable for representing the first workload.

In some embodiments, workload segments 502 in a first workload are in a sequence that is different from workload segments 502 in a second workload.

In some embodiments, a message sequence for a workload may be determined using a pseudo-random selection process. In some embodiments, a pseudo-random selection process may allow a particular workload segment 502 to be selected once from a plurality of workload segments 502.

In some embodiments, messages in a workload may be modified using target environment information, a target identifier, a target parameter, a target block size, a target capacity, configuration information, or user preference information.

In some embodiments, a workload may include messages associated with SCSI commands, internet iSCSI commands, NAS commands, NFS commands, SMB commands, CIFS commands, SAN commands, and/or I/O commands.

It will be appreciated that while some examples and embodiments disclosed herein involve or utilize iSCSI and/or SCSI protocols, messages, and/or commands, aspects of the present subject matter may utilize different and/or additional protocols, messages, and/or commands. For example, WM 102 may generate and/or scale workloads that include CIFS, SMB, and/or NFS messages and/or other I/O related messages.

It should be noted that computing platform 100, WM 102, and/or functionality described herein may constitute a special purpose test device. Further, computing platform 100, WM 102, and/or functionality described herein can improve the technological field of testing network devices and can improve generation and/or scaling of workloads for testing or other purposes.

The subject matter described herein for generating and/or scaling a workload improves the functionality of testing platform and testing in general by providing for more efficient workload generation. It should also be noted that a computing platform that implements the subject matter described herein may comprise a special purpose computing device usable to test data network equipment and/or storage network equipment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for scaling a workload, the method comprising:
   at a network equipment test device:
      generating a first workload comprising a plurality of messages associated with one or more transactions;
      determining one or more workload segments in the first workload, wherein each of the one or more workload segments represents one or more messages associated with a particular transaction, wherein the first workload includes a first workload segment for reading, writing, or accessing a first amount of data in a first logical unit (LU); and
      generating a second workload using the one or more workload segments, wherein the second workload includes a number of the workload segments, wherein the second workload includes a scaled workload segment based on the first workload segment and a workload scale attribute, wherein the scaled workload segment is for reading, writing, or accessing a second amount of data in a second LU, wherein the second amount of data is determined based on the first amount of data and a storage size of the second LU.

2. The method of claim 1 comprising:
   sending messages associated with the second workload to a system under test.

3. The method of claim 1 wherein the workload scale attribute includes a workload data transfer length, a workload data rate, or a workload duration.

4. The method of claim 1 wherein the first workload is generated based on messages detected using a message capture process.

5. The method of claim 4 wherein the messages detected using a message capture process are filtered and stored in an extensible markup language (XML) file usable for representing the first workload.

6. The method of claim 1 wherein the workload segments in the first workload are in a sequence that is different from the workload segments in the second workload.

7. The method of claim 1 wherein a sequence for the workload segments in the second workload is determined using a pseudo-random selection process, wherein a particular workload segment is selected once from a plurality of workload segments.

8. The method of claim 1 wherein messages in the second workload are modified using target environment information, a target identifier, a target parameter, a target block size, a target capacity, configuration information, or user preference information.

9. The method of claim 1 wherein the second workload includes messages associated with small computer system interface (SCSI) commands, internet SCSI (iSCSI) commands, network attached storage (NAS) commands, network file system (NFS) commands, server message block (SMB) commands, common Internet file system (CIFS) commands, storage area network (SAN) commands, or input and/or output (I/O) commands.

10. A system for scaling a workload, the system comprising:
    a network equipment test device comprising at least one processor and memory:
       a workload module implemented using the at least one processor and the memory, wherein the workload module is configured to generate a first workload comprising a plurality of messages associated with one or more transactions, to determine one or more workload segments in the first workload, wherein each of the one or more workload segments represents one or more messages associated with a particular transaction, wherein the first workload includes a first workload segment for reading, writing, or accessing a first amount of data in a first logical unit (LU), and to generate a second workload using the one or more workload segments, wherein the second workload includes a number of the workload segments, wherein the second workload includes a scaled workload segment based on the first workload segment and a workload scale attribute, wherein the scaled workload segment is for reading, writing, or accessing a second amount of data in a second LU, wherein the second amount of data is determined based on the first amount of data and a storage size of the second LU.

11. The system of claim 10 wherein the workload module is configured to send messages associated with the second workload to a system under test.

12. The system of claim 10 wherein the workload scale attribute includes a workload data transfer length, a workload data rate, or a workload duration.

13. The system of claim 10 wherein the first workload is generated based on messages detected using a message capture process.

14. The system of claim 13 wherein the messages detected using a message capture process are filtered and stored in an extensible markup language (XML) file usable for representing the first workload.

15. The system of claim 10 wherein the workload segments in the first workload are in a sequence that is different from the workload segments in the second workload.

16. The system of claim 10 wherein the workload module is configured to determine a sequence for the workload segments in the second workload using a pseudo-random selection process, wherein a particular workload segment is selected once from a plurality of workload segments.

17. The system of claim 10 wherein messages in the second workload are modified using target environment information, a target identifier, a target parameter, a target block size, a target capacity, configuration information, or user preference information.

18. The system of claim 10 wherein the second workload includes messages associated with small computer system interface (SCSI) commands, internet SCSI (iSCSI) commands, network attached storage (NAS) commands, network file system (NFS) commands, server message block (SMB) commands, common Internet file system (CIFS) commands, storage area network (SAN) commands, or input and/or output (I/O) commands.

19. A non-transitory computer readable medium comprising computer executable instructions embodied in the computer readable medium that when executed by a processor of a computer perform steps comprising:
at a network equipment test device:
generating a first workload comprising a plurality of messages associated with one or more transactions;
determining one or more workload segments in the first workload, wherein each of the one or more workload segments represents one or more messages associated with a particular transaction, wherein the first workload includes a first workload segment for reading, writing, or accessing a first amount of data in a first logical unit (LU); and
generating a second workload using the one or more workload segments, wherein the second workload includes a number of the workload segments, wherein the second workload includes a scaled workload segment based on the first workload segment and a workload scale attribute, wherein the scaled workload segment is for reading, writing, or accessing a second amount of data in a second LU, wherein the second amount of data is determined based on the first amount of data and a storage size of the second LU.

20. The non-transitory computer readable medium of claim 19 comprising:
sending messages associated with the second workload to a system under test.

* * * * *